United States Patent [19]

Hwo et al.

[11] Patent Number: 5,024,888
[45] Date of Patent: Jun. 18, 1991

[54] MODIFIED POLYBUTYLENE-BASE HOT MELT COMPOSITIONS

[75] Inventors: Charles C. Hwo, Sugar Land; Simone Mostert, Cypress, both of Tex.

[73] Assignee: Shell Oil Company, Houston, Tex.

[21] Appl. No.: 560,647

[22] Filed: Jul. 30, 1990

Related U.S. Application Data

[60] Division of Ser. No. 306,430, Feb. 3, 1989, Pat. No. 4,977,206, which is a continuation-in-part of Ser. No. 91,484, Aug. 31, 1987, abandoned.

[51] Int. Cl.$^5$ .................. C09J 151/00; B32B 7/12; B32B 15/04
[52] U.S. Cl. .................. 428/355; 428/343; 428/349; 524/504; 525/74; 525/78
[58] Field of Search .................. 428/343, 355, 349; 524/504; 525/74, 78

[56] References Cited

U.S. PATENT DOCUMENTS

| | | | |
|---|---|---|---|
| 3,362,940 | 1/1968 | Edwards et al. | 260/88.2 |
| 3,573,240 | 3/1971 | Flanagan | 260/23 |
| 3,658,948 | 4/1972 | McConnell | 260/897 |
| 3,868,433 | 2/1975 | Bartz et al. | 260/876 |
| 3,879,492 | 4/1975 | Bontinick | 260/857 |
| 3,896,067 | 7/1975 | Kosaka et al. | 260/28.5 |
| 3,900,534 | 8/1975 | Schard | 260/897 |
| 4,189,519 | 2/1980 | Ticknor | 428/476 |
| 4,198,327 | 4/1980 | Matsumoto et al. | 260/4 |
| 4,298,712 | 11/1981 | Machonis, Jr. et al. | 525/74 |
| 4,440,911 | 4/1984 | Inoue et al. | 525/301 |
| 4,539,263 | 9/1985 | Hoh | 428/500 |
| 4,554,304 | 11/1985 | Hansen et al. | 524/291 |
| 4,602,056 | 7/1986 | Waniczek et al. | 524/272 |
| 4,619,972 | 10/1986 | Inoue et al. | 525/193 |
| 4,665,130 | 5/1987 | Hwo | 525/222 |
| 4,666,778 | 5/1987 | Hwo | 428/412 |
| 4,977,206 | 12/1990 | Hwo et al. | 524/504 |

FOREIGN PATENT DOCUMENTS 179543A 10/1984 Japan.
181882A 8/1986 Japan.
010107A 1/1987 Japan.

*Primary Examiner*—George F. Lesmes
*Assistant Examiner*—D. R. Zirker

[57] ABSTRACT

A hot melt adhesive and a laminar structure fabricated from a blend comprising a modified or unmodified ethylenic copolymer, a modified or unmodified butene-1 homopolymer or copolymer, a stabilizer and one or more of: a tackifying resin compatible with the major amount of modified polymer, a wax, and atactic polypropylene.

15 Claims, No Drawings

MODIFIED POLYBUTYLENE-BASE HOT MELT COMPOSITIONS

This is a division of application Ser. No. 306,430, filed Feb. 3, 1989, now U.S. Pat. No. 4,977,206, which in turn is a continuation-in-part of U.S. Ser. No. 091,484, filed Aug. 31, 1987, now abandoned.

BACKGROUND OF THE INVENTION

The present invention relates to a hot melt adhesive capable of forming a peelable adhesive bond and which is substantially composed of modified butene-1 homopolymer or copolymer or a modified ethylene homopolymer or copolymer. It is anticipated that this hot melt adhesive will be capable of exhibiting good polymer to polymer bonding. The present invention also relates to a laminar structure formed with the novel hot melt adhesive capable of forming peelable seals.

Hot melt adhesives can be formulated to be pressure sensitive but these adhesives are usually soft, tacky and have limited strength and adhesion. Conventional hot melts such as formulations of ethylenevinyl acetate copolymer (EVA), polyethylenes (PE), polyamides, or polyesters are rigid, and form good strong bonds to certain substrates and are generally incapable of being peelable.

Solvent applied contact adhesives provide good bond strengths but they require the use of solvents which can be either toxic, or pollutants or fire hazards. Further, few of these adhesives are capable of "peelability" as the term is later defined.

The novel polybutylene hot melt adhesive of the present invention is unique in that it requires no solvents, and has peel-ability, and is capable of bonding to a variety substrates.

A "peelable seal or bond" or a seal or bond having "peelability" is defined to be the seal or joint between two films or other types of substrates produced by either, heat sealing, impulse sealing, or application as a hot melt between two surfaces with the joint thus formed being able to be opened in the original plane joining the two films, by the action of a pulling force, without the opening of the joint causing wrenching off or tearing in the substrate(s) and the material from which the two films of the joint are made. For the purposes of the present inventing, the peelable seal or bond must possess a mechanical resistance to opening or "peeling" which is sufficient to maintain a tight seal around an item or quantity of liquid or solid during storage and transport until a user of the packaged article wants access to the contents of the sealed packaging. The mechanical resistance of the peelable seal must be low enough to permit ready manual opening of the joint, i.e., without the use of an auxiliary instrument to break the joint.

The term "peelability" in this application refers to the sealed area of the adhesive where the adhesive is joined to a substrate. The adhesive peelability is measured by the degree of strength applied. Such hot melt adhesive peelability can be measured by ASTM testing method D-1876, (T-Peel test) for 180° peelability and alternatively by ASTM testing method D-903 for 180° peelability.

The invention relates to blends and a method for making a blend usable as a hot melt adhesive in a packaging application. This invention relates to laminates prepared with these hot melt adhesives and which are characterized by a nearly constant peel strength over an extended heat seal or application temperature. The blends, films and/or laminates of the present invention permit the manufacture of a more consistent finished product, having a seal of predictable and constant peel strength, in spite of inevitable variations in the heat seal temperatures or application temperature used in the production of such packages.

In the past, many varieties of thermoplastic materials have been employed in the manufacture of films capable of forming peelable seals. See, for example, U.S. Pat. No. 4,189,519, to American Can, which discloses a blend for producing a peelable heat seal comprising (1) about 50 to 90 percent by weight of a copolymer of about 80 to 96 percent by weight ethylene and about 4 to 20 percent by weight of an ethylenically unsaturated ester, and (2) about 10 to 50 percent by weight of a crystalline isotactic polybutylene. While capable of forming a peel seal, the film of the '519 patent comprises polybutylene as a minor component. The blend of '519 bonds to high density polyethylene (HDPE) without the use of adhesive, and will not bond to polypropylene without an adhesive.

U.S. Pat. No. 3,900,534 to Mobil Oil Corporation discloses thermoplastic shrink films with good heat seal characteristics and good optical properties, however, '534 does not address the need for a peel seal film.

U.S. Pat. No. 3,879,492 to UCB S. A. Belgium discloses blends consisting of polybutylene, styrene-butadiene copolymer, low density polyethylene, high density polyethylene, and polyisobutylene.

U.S. Pat. No. 4,539,263 to E. I. DuPont de Nemours & Co. discloses peel seals based on propylene/o-olefin copolymer. Patent '263 does not appear to provide disclosure directed toward polybutylene polymers.

U.S. Pat. Nos. 4,665,130 and 4,666,778 disclose blends of polybutylene and EVA (or polyethylene) and polypropylene with the polypropylene being less than 15 weight percent in the blend. However, none of these references teaches the novel invention.

U.S. Pat. No. 3,573,240 describes hot melt adhesive compositions for hard cover book binding. At column 4, lines 1 through 7, '240 teaches that minor amounts i.e., up to about 5% by weight of alpha olefin comonomers such as ethylene and propylene may be present in the butene-1 polymerization system without any substantial loss of the desirable properties displayed by the resultant, essentially homopolymeric system. The '240 patent also recites, in column 2, lines 61 through 63, that the book binding hot melt adhesives display good heat stability and rapid setting speeds. The '240 patent does not disclose a peelable hot melt adhesive, even though up to about 5% by weight of ethylene may be added to a substantially butene-1 polymerization system. Thus, '240 is in opposite from the teachings of the present invention which describes the use of a blend of an ethylene homopolymer or copolymer with a modified butene-1 homopolymer or copolymer to form a peelable bond.

Other patents of interest include U.S. Pat. No. 4,198,327 to Matsumoto which describes a composition having improved adhesion that is made up of a Component A (which is 70 to 99 parts of a crystalline polyolefin which has been grafted with a monomer selected from the group consisting of unsaturated carboxylic acids and their anhydrides, esters, amide imides, and metal salts with the grafting monomer in an amount of 0.0001 to 3% by weight) and a second Component (B)

which is 1 to 30 parts by weight of a hydrocarbon elastomer wherein the hydrocarbon elastomer is either ethylene/propylene rubber, ethylene-1-butene rubber, butyl rubber, butadiene rubber, sytrene/butadiene rubber, ethylene/butadiene rubber, or isoprene rubber.

Also of interest are two patents issued to Inoue, U.S. Pat. Nos. 4,619,972 and 4,440,911. U.S. Pat. No. '972 describes a modified polymer composition comprising elastomers blended with not more than 50 parts by weight of a crystalline polyolefin that is prepared by reaction of the polymer with an unsaturated carboxylic acid or its acid anhydride. The elastomers of this patent include ethylene/butene-1 copolymer, ethylene/propylene copolymer, a styrene/butadiene copolymer or mixtures thereof. The crystalline polyolefin of this invention includes homopolymers of olefins or copolymers of different kinds of olefins such as high density polyethylene, medium density polyethylene, low density polyethylene, crystalline ethylene/propylene copolymer, crystalline ethylene/butene-1 copolymer, polypropylene, crystalline propylene/ethylene copolymer, polybutylene-1, and poly(4-methyl-pentene-1). Mixtures of two or more of those polymers or copolymers can be used. U.S. Pat. No. '911 describes a fabricated composition that comprises linear low density copolymers of ethylene and an alpha-olefin where the alpha-olefin is selected from the group which includes butene-1, hexene-1, methylpentene-1, and octene-1 and comprises between 3 and 14 weight percent of the copolymer where the copolymer is reacted with 0.01 to 3 weight percent of an unsaturated carboxylic acid or a derivative thereof.

Additionally, U.S. Pat. No. 4,298,712 to Machonis describes adhesive composition which are related to the present invention. Additional references include U.S. Pat. Nos. 3,658,948 to McConnell; 3,868,433 to Bartz; and Japanese Patent No. 0179543. These are patents that describe inventions that fall within the general area of the present invention. Also, U.S. Pat. No. 3,896,067 to Kosaka, and U.S. Pat. No. 4,602,056 to Waniczek, as well as two Japanese Patents, Patent No. 2010107 to Mitsubishi and Patent No. 1181882 to Mitsui, are of interest. The Kosaka patent discloses a hot melt adhesive containing a maleic anhydride grafted EVA copolymer and a polyolefin. The Waniczek patent shows grafted EVA in hot melt adhesives. The Japanese references pertain to blends of modified butene polymers with ethylene polymers and are representative of the state of the art.

The present invention, directed to a hot melt adhesive made from specific modified ethylenic copolymer and specific butene-1 homopolymers with or without other components, appears to lie outside the scope of the known art.

Hot melt adhesives with long open time good bonding to cold metals are made of blends of a maleic anhydride modified copolymer of butene-1 and ethylene, an aliphatic, substantially non-polar resin, a antioxidizing agent and, optionally, microcrystalline wax, a block copolymer and atactic polypropylene are described in U.S. Pat. No. 4,554,304. This patent discloses a variety of modified butene-1 homopolymers and copolymers useful within the scope of the present invention, as well as methods for preparing these modified butene-1 polymers. Modified ethylene copolymer and homopolymer usable within the scope of the present invention are not taught in this disclosure.

The instant invention recognizes that conventional multilayer peel seal films or sheets are comprised of substrates and peelable sealings wherein the sealants are not hot melt type of adhesives. The present invention teaches a novel hot melt adhesive blend, a laminar structure and a method of making a packaging film system which is capable of peelability. The instant invention has, as an object, a peelable system which avoids delamination between layers when the sealed layers are pulled apart. In some embodiments, a tackifying resin is added to help bind together incompatible substrates.

It should be noted that the present invention has been developed to provide a blend of two non-compatible polymers to form a bond with a controllable cohesive strength.

Several terms are used throughout the specification. "Noncompatible polymers" are defined as polymers which, when blended or mixed, separate into two separate phases. "Controllable Cohesive Strength" refers to an adhesive wherein the cohesive strength can be varied or controlled by changing the ratio of noncompatible components.

SUMMARY OF THE INVENTION

In the present invention, the hot peelable melt adhesive, can comprise either a modified butene-1 homopolymer or copolymer blended with about 5% by weight to about 50% by weight of an ethylenic copolymer and a small amount of stabilizer (up to 1 part per hundred) or alternatively, a modified ethylenic copolymer blended with about 5% by weight to about 50% by weight of a butene-1 homopolymer or copolymer and a small amount of a stabilizer, (up to 1 part per hundred). A quantity of a tackifying resin can be added to the novel blends, and the amount can be varied depending on the other components used in the adhesive. Optionally, up to 30 phr of a wax, and/or up to 15 phr of an atactic propylene homopolymer or copolymer can be added to the novel blend formulations.

In the present invention, a laminar structure can be made using the novel hot melt adhesive formulations to form peelable structures or closures. Compatible substrates of nylon, polycarbonate, stainless steel and other similar materials, as well as substrates which are non-compatible towards the formulations could be used.

DETAILED DESCRIPTION OF THE PREFERRED EMBODIMENT

Within the scope of the present invention the term "modified" refers to polymers which have been associated, such as by intimate blending, with a small amount of maleic anhydride in amounts from 0.05 to 5% by weight. Alternatively, "modified polymers" may be polymers which have been associated with a quantity of peroxide, such as by blending in a tumbler or drum, to become crosslinked and then additionally blended with a small amount of maleic anhydride. The modified polymers may be referred to herein as graft polymers.

The modified butene-1 homopolymer and copolymers are a unique group of olefinic polymers because of their slow crystallization rates. The very slow crystallization rate of modified butene-1 polymers, in contrast to the crystallization rates of other polyolefin crystalline polymers such as EVA, polyethylene and polypropylene, have been found to be beneficial in formulating the novel hot melt adhesives which have good adhesion to a variety of substrates (metals such as stainless steel and anodized aluminum, for example).

Modified polybutylene homopolymers and copolymers useful with the present invention are primarily linear chain molecules with regular and spatially ordered arrangements of ethyl side groups; the groups that result when one butene is polymerized across the 1,2 carbon double bond along an ethylene chain backbone. When cooled from a melt, the ethyl side groups initially align in a tetragonal spatial arrangement, developing a little over one half of the ultimate crystallinity (form II) of the polymer. With time, the tetragonal crystalline phase form II transforms into a stable hexagonal spatial arrangement with subsequent development of additional crystallinity form I. Modified butene-1 copolymers can be modified butene-1 ethylene copolymers with an ethylene comonomer content in a range of 1-30 mole percent though 11-20 mole percent is preferred.

Unmodified or "non-modified" butene-1 homopolymers and copolymers are usable within the scope of the present invention only when used in conjunction with a modified ethylene homopolymer or copolymer component. Unmodified polybutylene homopolymers are disclosed in U.S. Pat. No. 3,362,940 and incorporated by reference herewith. Unmodified butene-1 copolymers can comprise one or more of a variety of alpha-olefins, see for example the butene-1 copolymers also taught in U.S. Pat. No. 3,362,940. Butene-1/ethylene copolymers, with ethylene comonomer content in the range of 11-20 mole percent are expected to be particularly useful in the present inventive hot melt adhesive as the ethylene comonomer produces a lower glass transition temperature ($T_g$) amorphous phase, further reduces the crystallization rate of the adhesive and further reduces the ultimate level of crystallinity in the polymer. The development of the inventive hot melt adhesive with these novel peelability features can be formulated with a variety of other components, such as tackifying resins, waxes, oils, stabilizers, and other additives, such as atactic polypropylene homopolymer or copolymer.

The butene-1 polymers of the present invention can be butene-1 homopolymers or alternatively butene-1 copolymers with a comonomer of propylene, ethylene, or an alpha olefin having from 5 to 8 carbon atoms. If butene-1 copolymers are used, the comonomer mole percent is preferably between 1 and 30 mole % based on the entire copolymer.

The modified and unmodified butene-1 homopolymers and copolymers usable within the scope of the present invention, can be selected from polymers in a wide range of melt flows fractional to 1000 dg/min based on ASTM D1238 condition E at 190° C. High melt flow polymers and low melt flow polymers are contemplated as usable herein. Shell Chemical Company Polybutylene 0800 is considered usable herein.

Within the scope of the present invention, modified and unmodified ethylene components are used. Modified ethylene copolymers having melt flows that range from fractional to 100 dg/min based on ASTM test D1238, condition E at 190° C are particularly useful.

Within the scope of the present invention, the ethylenic copolymer may be a modified or unmodified ethylene vinyl acetate copolymer (EVA), a modified or unmodified ethylene methyl acrylate copolymer (EMA), or a modified or unmodified ethylene-acrylic acid copolymer. Most preferably, ethylene vinyl acetate copolymers in either the modified or unmodified form, depending on which butene-1 component is selected, are considered particularly usable within the scope of the invention.

It is contemplated that a modified ethylene component is only usable with an unmodified butene-1 component, and an unmodified ethylene component is only usable with a modified butene-1 component in the present invention.

Stabilizers usable within the scope of the present invention can be hindered phenols, such as Irganox 1010, made by Ciba Geigy Corporation, Ethanox 330 made by Ethyl Corporation, or phosphorus-based stablizers, such as Irgafos 168 made by Ciba Geigy Corp. Irganox 1010 is the most preferred stabilizer for use in this invention. The quantity of stabilizer usable within the scope of the present invention is expressed in parts per hundred (phr) based on the total amount of the components in the hot melt adhesive which are expressed in weight percent. Ethanox 330 is a 1,3,5,-trimethyl-2,4,6-tris [3,5-di-tert-butyl-4-hydroxy-benzyl] benzene. Irganox 1010 is usually referred to as tetrakis [methylene (3,5-di-tert-butyl-4-hydroxyhydrocinnamate)] methane. It is preferred to use about 0.3 phr of a stabilizer, although about 0.1 to about 2 phr is also usable within the scope of the invention.

Tackifying resins usable within the scope of the present invention can be either compatible with the modified or unmodified copolymer component or compatible with the modified or unmodified butene-1 homopolymer or copolymer component and generally not with both the butene and the ethylene polymers. It is necessary that the tackifying resin be compatible with the modified component of the blend.

If a modified or unmodified ethylene copolymer compatible tackifying resin is used in the present invention, it can be selected from the group of polar tackifier resins. Rosin esters or aliphatic hydrocarbon resins may be usable within the scope of the invention. Examples of resins compatible with the modified or unmodified ethylene copolymer include, Zonester 85 (Glycerol esters of disproportionated tall oil rosin) and Zonester 100 made by Arizona Chemical Company, or Kristalex 3070 (an alpha methyl styrene based resin) made by Hercules Corporation.

If a modified or unmodified butene-1 homopolymer or copolymer compatible tackifying resin is used in the present invention, it is preferred that the tackifying resin be non-polar, such as Regalrez 1078 (a hydrogenated hydrocarbon resin) made by Hercules, Escorez 1304 (also a hydrocarbon resins) available from Exxon Chemical Company, Wingtack 95 (a synthetic polyterpene resin), or Wingtack 85, all available from Goodyear Tire and Rubber. Within the scope of the present invention, a member of the group consisting of: partially hydrogenated $C_9$ based hydrocarbon resins with softening points in a range of 70° C to 125° C, as well as $C_5$ stream resins, and polyterpenes, in amounts of from about 20% by weight to about 60% by weight and preferably 50% by weight also can be incorporated into the adhesive.

The waxes usable in the present invention can be microcrystalline waxes, though other waxes may be used. The waxes may be used in amounts up to 30 phr (parts per hundred) based on the overall adhesive composition. Shellwax ® 100, 300, and 500 are examples of waxes likely to be preferred for use within the scope of the present invention. A sufficient amount of the wax, 10 to 30 phr, and preferably 20 phr, should be usable in the invention and provide the advantage of lowering viscosity in the overall adhesive composition without substantially decreasing the service temperature of the adhesive.

Atactic polypropylene (such as AFAX 510 made by Hercules Inc. of Wilmington, Delaware) may be added to the novel composition in amounts ranging up to about 15 phr of the overall adhesive formulation. Most preferably, 15 phr of Afax 510 is contemplated to provide the most advantageous benefits such as: (1) improved processability of the overall adhesive formula by acting as a diluent, and (2) reduced cost of the resulting adhesive.

The quantity of atactic polypropylene usable within the scope of the present invention is expressed in phr of the components of the hot melt adhesive in a manner identical to the method used for expressing the quantity of stabilizer usable within the scope of this invention.

Plasticizers, such as oils, like Shellflex® 371, can also be added to the composition to reduce the cost of production in making the final peelable product. These plasticizers may also enhance processability of the adhesive.

The present invention includes a laminated structure wherein adhesive is used between substrates in a continuous or non-continuous manner. If the adhesive is to be applied in a continuous manner, the substrate should be compatible with the major component of the adhesive. If the adhesive is to be non-continuously applied, the substrate can be either compatible or non-compatible with the major component.

The laminated structure could contain one of the following as a substrate: nylon, polyester, polyvinyl chloride (PVC), high density polyethylene (HDPE), polypropylene (PP), polycarbonate (PC), polystyrene (PS), polyacrylonitrile (PAN), paper or aluminum foil or poly-4-methyl pentene. It is not intended that the substrate of the laminated structure be limited to only the above named compounds, any compound usable as a substrate, within the scope of the present invention is contemplated.

For modified butene-1 "rich" adhesives, (i.e., high butene-1 content adhesives, usually with more than 50 wt % butene-1) the compatible substrate would be foil, polypropylene, treated steel, aluminum, and paper. Substrates compatible with an adhesive having a major amount of modified ethylene include, paper, polyester and high density polyethylene.

Substrates which are non-compatible with adhesives having as the major component modified polybutene include: polycarbonate, polyacrylnitrile copolymer, poly-4-methyl pentene, nylon, polyvinyl chloride, (PVC), and high density polyethylene.

Substrates which are non-compatible with adhesives having as the major component, modified polyethylene include: polycarbonate, polyacrylnitrile copolymer, poly-4-methyl pentene, and polypropylene.

The addition of a tackifying resin will most likely alter the adhesive effect between the substrate and the adhesive.

The laminated structure can be made by coating the inventive hot melt adhesive on at least one side of a substrate. A sandwich style laminate is also contemplated within the scope of the invention.

It has been discovered that a hot melt adhesive may be made with components (a) and (b) having ratios (a):(b) that range from 70:30 to 30:70 percent by weight of the major component of the blend either (a)(1) modified ethylene copolymer or (2) modified butene-1 homopolymer or copolymer to (b) tackifying resin. These percentages may be altered to be within the more preferred ratio of 60:40 to 40:60. The most preferred embodiment is contemplated as 50:50 (in weight percent) of modified butene-1 component or modified ethylene component to the respective compatible tackifying resins.

If the adhesive composition comprises additional components of tackifying resin and atactic polypropylene, wax and/or another stabilizer, and the composition consists of a minor amount of butene-1 homopolymer or copolymer and a major amount of the modified ethylene component then the composition can comprise formulations such as those appearing below:

(I) a formulation consisting of from about 66.6 to about 15 weight percent of a modified ethylene copolymer, from about 5 to about 50 weight percent of a butene-1 homopolymer or copolymer, up to 1 part per hundred of a stabilizer, from about 15 to about 66.5 weight percent of a modified ethylene compatible tackifying resin, up to 30 phr of a wax, and/or up to 15 phr of atactic polypropylene, and further wherein the composition of tackifying resin to modified ethylene copolymer is in the range of from 30:70 to 70:30 of resin to modified ethylene copolymer.

(II) a formulation consisting of from about 57 percent by weight to about 20 percent by weight of a modified ethylenic copolymer, from about 5 percent by weight to about 50 percent by weight of a butene-1 homopolymer or copolymer, up to about 1 phr of a stabilizer, from about 57 percent by weight to about 20 percent by weight of a modified ethylene compatible tackifying resin, up to 30 phr of a wax and/or up to 15 phr of atactic polypropylene and further wherein the composition ratio of tackifying resin to moidified ethylene copolymer is in the range of from 40:60 to 60:40 of resin to modified ethylene copolymer, (III) a formulation which comprises from about 47.5 percent by weight to about 25 percent by weight of a modified ethylenic copolymer, form about 5 percent by weight to about 50 percent by weight of a butene-1 homopolymer or copolymer, up to about 1 phr of a stabilizer, and from about 25 percnet by weight to about 47.5 percent by weight of a modified ethylene compatible tackifying resin, up to 30 phr of a wax, and/or up to 15 phr of atactic polypropylene, and further wherein the composition of tackifying resin to modified ethylene copolymer is in a 1:1 ratio of resin to modified ethylene copolymer.

If the adhesive composition comprises wax and additional components, such as tackifying resin, atactic polypropylene, and/or another stabilizer, and the composition consists of a minor amount of an ethylene component, and a major amount of modified butene-1 homopolymer or copolymer, then the composition can comprise the formulations such as those appearing below:

(IV) a formulation consisting of from about 5 percent by weight to about 50 percent by weight of an ethylenic copolymer, from about 66.5 percent by weight to about 15 percent by weight of a modified butene-1 homopolymer or copolymer, up to about 1 part per hundred of a stabilizer, and from about 15 percent by weight to about 66.5 percent by weight of a modified butene-1compataible atackifying resin, up to 30 phr of a wax, and/or up to 15 phr of atactic polypropylene and further wherein the composition of tackifying resin to modified butene-1 homopolymer or copolymer is in the range from 30:70 to 70:30 of resin to modified butene-1 homopolymer or copolymer.

(V) a formulation consisting of from about 5 percent by weight to about 50 percent by weight of an ethylenic copolymer, from about 57 percent by weight to about 20 percent by weight of a modified butene-1 homopolymer or copolymer, up to about 1 part per hundred of a stabilizer, and from about 20 percent by weight to about 57 percent by weight of a modified butene-1 compatible tackifying resin, up to 30 phr of a wax, and/or up to 15 phr of atactic polypropylene resin and further wherein the composition of tackifying resin to modified butene-1 homopolymer or copolymer is in the range from 40:60 to 60:40 of resin to modified butene-1 homopolymer or copolymer.

(VI) a formulation that comprises from about 5 percent by weight to about 50 percent by weight of an ethylenic copolymer, from about 47.5 percent by weight to about 25 percent by weight of a modified butene-1 homopolymer or copolymer, up to about 1 phr of a stabilizer, and from about 25 percent by weight to about 47.5 percent by weight of the modified butene-1 compatible tackifying resin, up to 30 phr of a wax and/or up to 15 phr of atactic polypropylene, and further wherein the composition of tackifying resin to modified butene-1 homopolymer or copolymer is in the ratio of 1:1 of resin to modified butene-1 homopolymer or copolymer.

EXAMPLE I

Adhesive Preparation

Modified butene-1 or modified ethyl vinyl acetate (EVA) polymers can be prepared by functionalizing butene-1 or EVA with maleic anhydride. The modified butene-1 polymers may be prepared by mixing polybutylene pellets with a peroxide (Lupersol 101) at 2000–10000 ppm and the appropriate amount of maleic anhydride. The mixture should be passed through a heated extruder. The temperature of the extruder should be chosen so as to melt the polybutylene and to cause substantially complete decomposition of the peroxide for example, heat at 200° C and using an rpm to obtain about a 2 minute residence time. Typically 1000–4000 ppm of a peroxide (Lupersol 101) can be used with 0.1% wt to 5% wt maleic anhydride.

Adhesives may be prepared using either a small Brabender compound head (approximately 50 cc capacity) or a one quart sigma blade mixer. The test formulations can be blended using preheated equipment (preheated to 170° C–180° C) by introducing the polybutylene polymer, and mixing, until a soft, homogeneous mass is formed, and then gradually introducing the remaining ingredients. Batch times can be about 20 minutes.

EXAMPLE II

Adhesive Film

Thin adhesive films (125 to 200 microns) can be prepared by casting onto release coated polyester film (onto release coated side) using a pair of heated nip rolls that are adjusted to produce the desired gap, (hence the defined adhesive thickness). Preheated adhesive (at about 130° C) can be poured onto a polyester film and hand drawn through the heated nip rolls. Alternatively, the adhesive can be poured onto the substrate and a "doctor blade" can be "drawn down" the adhesive to achieve a uniform coating on the substrate. Other methods of applying hot melt adhesive can also be used. For continuous or non-continuous application, techniques such as spraying the adhesive, using hot melt guns to apply adhesive or extruding the adhesive can be used. Using the first described technique, adhesive films, 4" wide and 8" long, can be produced with a small quantity (<60 gms) of adhesive, so that very small quantities of adhesive can be evaluated.

Once cooled and allowed to set, these adhesives can be used to prepare test specimens. For example, Kraft paper to Kraft paper, polypropylene to polypropylene and polyethylene to polyethylene bonds can be made by cutting adhesive squares from the polyester film, peeling them off, placing the adhesive between the paper and heat sealing with a hot bar sealer (time, pressure and temperature can be adjusted). Alternately, the adhesive square or an adhesive strip may be placed on a piece of plastic or metal substrate, melted with a heat gun (or in an oven), and then joined under moderate contact pressure to form T-peel, lap shear or SAFT bonded substrate specimens.

TESTING METHODS

1. Adhesive Hot Melt Viscosity—Viscosities can be measured at 177° C. in a Brookfield Thermocell Viscometer with an RVT head and Number 29 spindle (ASTM D3236)., for low viscosity formulations, a number 27 spindle can be used.
2. Peel Strength—a 25 mm × 150 mm laminate sandwich can be formed with the substrate of interest, the adhesive as the interlayer between the substrate surfaces. The laminate surfaces can be placed in an Instron tester, one surface in the lower jaw. The jaws can be separated at a rate of 25 cm/min. Force required to peel the surfaces can be recorded continuously. The maximum and minimum values should be noted, as well as failure mode, i.e., adhesive, cohesive, or a combination. This test should approximate a peel angle of about 180° C.

Table 2 illustrates the anticipated differences between the adhesives consisting of a major amount of modified butene-1 component and a minor amount of ethylene component or a major amount of modified ethylene component and a minor amount of butene-1 component.

TABLE 2

| | Hot Melt Adhesives wt % | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Formulation | | | | | | | | | | | | |
| Butene-1 polymer[1] | 85 | — | 15 | 15 | 55 | — | 15 | 15 | 50 | — | 15 | 15 |
| Modified butene-1 polymer[2] | — | 85 | — | — | — | 55 | — | — | — | 50 | — | — |
| Ethylene polymer[3] | 15 | 15 | 85 | — | 15 | 15 | 55 | — | 15 | 15 | 50 | — |

TABLE 2-continued

| | Hot Melt Adhesives wt % | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Modified Ethylene polymer[4] | — | — | — | 85 | — | — | — | 55 | — | — | — | 50 |
| Tackifying Resin[5] | — | — | — | — | 30 | 30 | — | — | 25 | 25 | — | — |
| Tackifying Resin[6] | — | — | — | — | — | — | 30 | 30 | — | — | 25 | 25 |
| Wax[7] | — | — | — | — | — | — | — | — | 10 | 10 | 10 | 10 |
| Stabilizer[8] | 0.3 phr | 0.3 phr | 0.3 phr | 0.3 phr | 0.3 phr | 0.3 phr | 0.3 phr | 0.3 phr | 0.3 phr | 0.3 phr | 0.3 phr | 0.3 phr |
| TESTS | | | | | | | | | | | | |
| Adhesion to substrates | | | | | | | | | | | | |
| Aluminum Foil | N | Y | N | Y | N | Y | N | Y | N | Y | N | Y |
| Nylon | N | Y | N | Y | N | Y | N | Y | N | Y | N | Y |

[1] Butene-1 polymer is a copolymer of butene-1 and ethylene known as Duraflex ® Polybutylene 8910 available from Shell Chemical Company.
[2] Modified butene-1 polymer is polybutylene 8910 grafted with 1.0% wt maleic anhydride.
[3] Ethylene copolymer is ethylene vinyl acetate (EVA) Ultrathene ® 649-04 available from U.S. Industrial Co.
[4] Modified Ethylene Copolymer is EVA (649-04) grafted with 1.0% wt maleic anhydride.
[5] The tackifying resin is Zonester 85.
[6] The wax is Shellwax 400.
[7] The stabilizer is Irganox 1010, and is a hindered phenol.
[8] N = no bond; Y = yes, there is bond.

What is claimed is:

1. A laminar structure comprising a substrate which is bonded with a hot melt adhesive capable of peelability, and wherein said hot melt adhesive comprises:
   from about 50 percent by weight to about 95 percent by weight of a modified ethylenic copolymer selected from the group: maleated ethylene methyl acrylate copolymer, and maleated ethylene acrylic acid copolymer;
   from about 50 percent by weight to about 5 percent by weight of a butene-1 homopolymer or copolymer; and
   up to about 1 phr of a stabilizer.

2. The laminar structure of claim 1 wherein said adhesive comprises:
   from about 60 percent by weight to about 80 percent by weight of said modified ethylenic copolymer;
   from about 40 percent by weight to about 20 percent by weight of said butene-1 homopolymer or copolymer; and
   up to about 1 part per hundred (phr) of said stabilizer.

3. A laminar structure comprising a substrate which is bonded with a hot melt adhesive capable of peelability, and wherein said hot melt adhesive comprises:
   from about 66.5 percent by weight to about 15 percent by weight of a modified ethylenic copolymer selected from the group: maleated ethylene methyl acrylate copolymer, and maleated ethylene acrylic acid copolymer;
   from about 5 percent by weight to about 50 percent by weight of a butene-1 homopolymer or copolymer;
   up to about 1 phr of a stabilizer; and
   from about 15 percent by weight to about 66.5 percent by weight of a modified ethylene copolymer compatible tackifying resin; and further
   wherein the composition of said tackifying resin to said modified ethylene copolymer is in the range of from 30:70 to 70:30 of said resin to said modified ethylene copolymer.

4. The laminar structure of claim 3 wherein said adhesive comprises:
   from about 57 percent by weight to about 20 percent by weight of said modified ethylenic copolymer;
   from about 5 percent by weight to about 50 percent by weight of said butene-1 homopolymer or copolymer;
   up to about 1 phr of said stabilizer; and
   from about 20 percent by weight to about 57 percent by weight of said tackifying resin; and further
   wherein the composition ratio of said tackifying resin to said modified ethylene copolymer is in the range of from 40:60 to 60:40 of said resin to said modified ethylene copolymer.

5. The laminar structure of claim 3 wherein said adhesive comprises:
   from about 47.5 percent by weight to about 25 percent by weight of said modified ethylenic copolymer;
   from about 5 percent by weight to about 50 percent by weight of said butene-1 homopolymer or copolymer;
   up to about 1 phr of said stabilizer; and
   from about 25 percent by weight to about 47.5 percent by weight of said tackifying resin; and further
   wherein the composition of said tackifying resin to said modified ethylene copolymer is a 1:1 ratio of said resin to said modified ethylene copolymer.

6. The laminar structure of claim 1, wherein said substrate is selected from the group consisting of nylon, polyester, polyvinylchloride, high density polyethylene, polypropylene, paper, aluminum foil, polystryurene, polycrylonitrile, polycarbonate, and poly-4-methylpentene.

7. The laminar structure of claim 1, wherein said butene-1 copolymer comprises a comonomer which is a member of the group consisting of ethylene, propylene, and an alpha olefin having 5 to 8 carbon atoms.

8. The laminar structure of claim 1, wherein said butent-1 copolymer comprises a comonomer which is a member of the group consisting of ethylene, propylene, and an alpha olefin having 5 to 8 carbon atoms and wherein said comonomer is between about 1 and 30 mole percent.

9. The laminar structure of claim 1, wherein said stabilizer is a hindered phenol.

10. The laminar structure of claim 2, wherein said stabilizer is tetrakis methane.

11. The laminar strucure of claim 3, wherein said modified ethylene copolymer compatible tackifying resin is a member of the group consisting of:
  alphatic hydrocarbons including esters of disproportionated tall oil rosin and alpha methylstyrene based resin.

12. The laminar structure of claim 1, wherein said adhesive further comprises a wax.

13. The laminar structure of claim 1, wherein said adhesive further consists of a microcrystalline wax.

14. The laminar structure of claim 1, wherein said adhesive further consists of up to about 15 parts perhundred of atactic polypropylene.

15. The laminar structure of claim 1 wherein said ethylenic copolymer comprises about 0.05% by weight to about 5% by weight of grafted maleic anhydride.

* * * * *